(12) United States Patent
Shimada et al.

(10) Patent No.: US 8,761,264 B2
(45) Date of Patent: Jun. 24, 2014

(54) APPARATUS AND METHOD FOR CODING MOVING PICTURES

(75) Inventors: Satoshi Shimada, Kawasaki (JP); Akira Nakagawa, Kawasaki (JP); Hidetoshi Matsumura, Kawasaki (JP); Yasuhiro Watanabe, Kawasaki (JP); Akihiro Yamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1995 days.

(21) Appl. No.: 11/497,288

(22) Filed: Aug. 2, 2006

(65) Prior Publication Data

US 2007/0217508 A1   Sep. 20, 2007

(30) Foreign Application Priority Data

Mar. 17, 2006 (JP) .................................. 2006-074490

(51) Int. Cl.
*H04N 7/12* (2006.01)

(52) U.S. Cl.
USPC ............. 375/240.24; 375/240.16; 375/240.25

(58) Field of Classification Search
USPC .................................................. 375/240.24
See application file for complete search history.

(56) References Cited

U.S. PATENT DOCUMENTS

| | | | |
|---|---|---|---|
| 5,689,346 A * | 11/1997 | Noda et al. ................ | 358/426.11 |
| 5,974,184 A * | 10/1999 | Eifrig et al. .................... | 382/236 |
| 6,111,913 A * | 8/2000 | Murdock et al. ......... | 375/240.03 |
| 8,457,210 B2 * | 6/2013 | Masuda ...................... | 375/240.2 |
| 2005/0013363 A1 * | 1/2005 | Cho et al. ................. | 375/240.12 |
| 2005/0013494 A1 * | 1/2005 | Srinivasan et al. ............ | 382/233 |
| 2005/0196062 A1 | 9/2005 | Cho et al. ...................... | 382/240 |

FOREIGN PATENT DOCUMENTS

| | | |
|---|---|---|
| JP | 5-207290 | 8/1993 |
| JP | 10-304364 | 11/1998 |
| JP | 11-8849 | 1/1999 |
| JP | 2005-39842 | 2/2005 |
| JP | 2005-253088 | 9/2005 |

OTHER PUBLICATIONS

Japanese Patent Office Notice of Rejection mailed Aug. 24, 2010 for corresponding Japanese Patent Application No. 2006-074490.

* cited by examiner

*Primary Examiner* — Anner Holder
(74) *Attorney, Agent, or Firm* — Staas & Halsey LLP (57) ABSTRACT

The apparatus includes: orthogonal transforming means for orthogonally transforming an input video signal for each element block, quantizing means for quantizing each obtained transformation coefficient using a quantization parameter; coding means for coding the quantization parameter; decoded picture generating means for generating a reference picture signal for a motion compensation prediction from the quantized results of the quantizing means; filtering means for filtering the obtained reference picture signal at a strength corresponding to the quantization parameter when a non-zero effective transformation coefficient is present with respect to the element block; and controlling means for controlling at least anyone of transformation coefficients to be not zero, when all of the transformation coefficients are zero. This allows, even when all of the quantized results of the transformation coefficients of the element blocks are zero, coding of quantization parameter of current element block and control of filtering strength.

7 Claims, 9 Drawing Sheets

A PICTURE DIVIDED INTO MACRO BLOCKS

FIG. 9  RELATED ART

| | | | | | | | | | | |
|---|---|---|---|---|---|---|---|---|---|---|
| A | #1 | #2 | #3 | #4 | #5 | #6 | #7 | #8 | #9 | #10 |
| B | #11 | #12 | #13 | #14 | #15 | #16 | #17 | #18 | #19 | #20 |
| C | #21 | #22 | #23 | #24 | #25 | #26 | #27 | #28 | #29 | #30 |
| D | #31 | #32 | #33 | #34 | #35 | #36 | #37 | #38 | #39 | #40 |

APPARATUS AND METHOD FOR CODING MOVING PICTURES

CROSS REFERENCE TO RELATED APPLICATIONS

This application is based on and hereby claims priority to Japanese Application No. 2006-074490 filed on Mar. 17, 2006 in Japan, the contents of which are hereby incorporated by reference.

BACKGROUND OF THE INVENTION (1) Field of the Invention

The present invention relates to an apparatus and a method for coding moving pictures, for example, to a technology that is suitable when used in an apparatus employing the H.264 coding scheme.

(2) Description of Related Art

Figure 7:
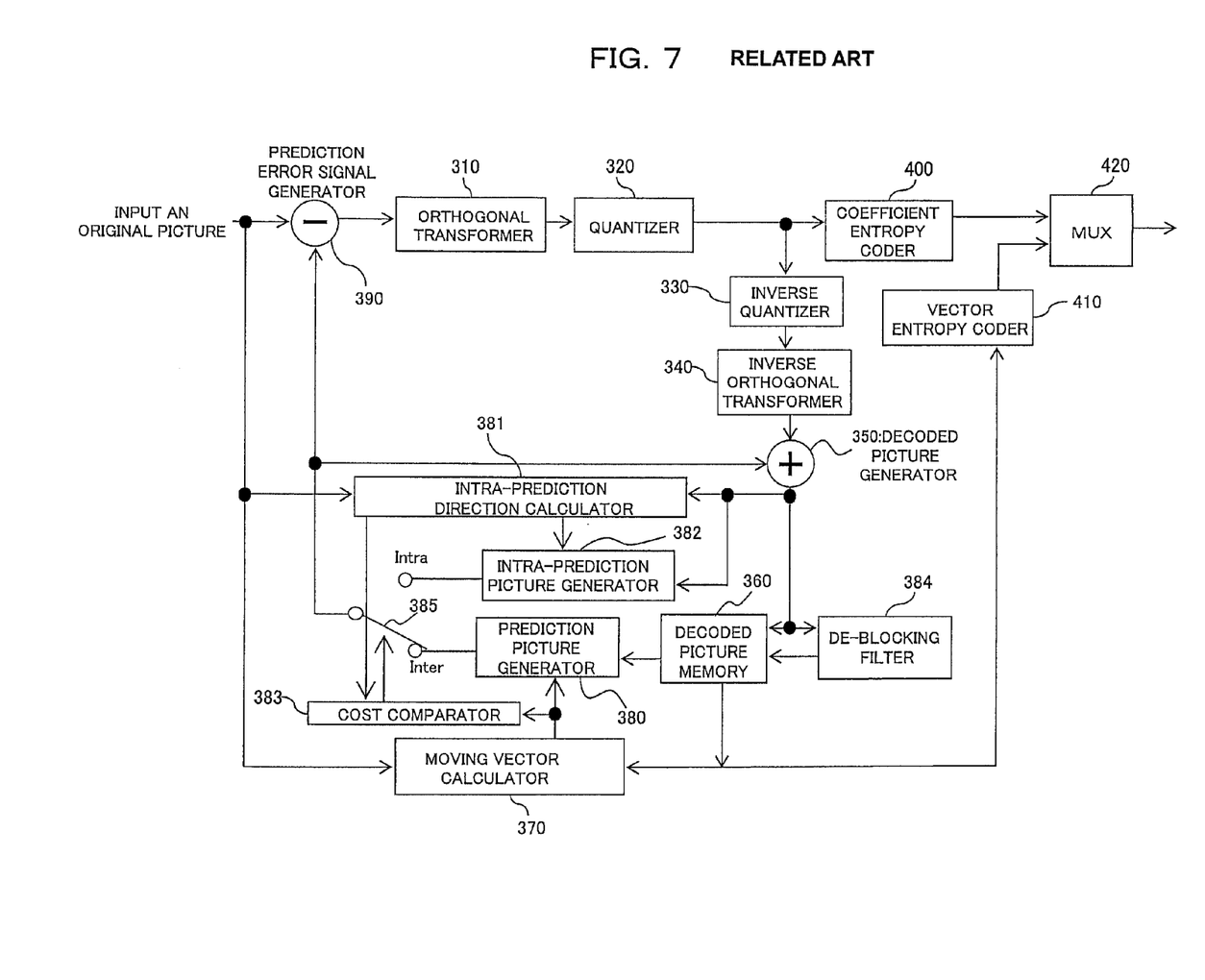
FIG. 7 is a block diagram showing a main configuration of an apparatus for coding moving pictures (H.264 encoder) employing the H.264 coding scheme.

FIG. 7 is a block diagram showing the main configuration of an apparatus for coding moving pictures employing the H.264 coding scheme (H.264 encoder). The apparatus for coding moving pictures (hereinafter also referred to as simply a "coding apparatus") shown in FIG. 7, includes an orthogonal transformer 310, a quantizer 320, an inverse quantizer 330, an inverse orthogonal transformer 340, a decoded picture generator (adder) 350, a decoded picture memory (frame memory) 360, a motion vector calculator 370, a prediction picture generator 380, an intra-prediction direction calculator 381, an intra-prediction picture generator 382, a cost comparator 383, a de-blocking filter (loop filter) 384, an intra/inter (intra-MB/inter-MB (MB is below-mentioned macro block)) switch 385, a prediction error signal generator (subtracter) 390, a coefficient entropy coder 400, a vector entropy coder 410, and a multiplexer (MUX) 420.

In the coding apparatus having such a configuration, a prediction error signal is generated at the prediction error generator 390 by detecting the difference between an original picture input (original picture signal) and a prediction picture signal generated by the prediction picture generator 380 (or the intra-prediction picture generator 382), and at the orthogonal transformer 310 after subjecting the prediction error signal to an orthogonal transformation (coefficient transformation) processing such as Discrete Cosine Transformation (DCT) by a macro block (MB) (element block) having a maximum block size of 16×16 pixels, the transformation coefficients are quantized using a quantization parameter (QP) at the quantizer 320.

Then the quantized results are subjected to entropy coding such as Huffman coding or arithmetic coding at the coefficient entropy coder 400, and multiplexed with the results of the entropy coding of motion vectors calculated by the motion vector calculator 370 on a multiplexer (MUX) 420 at the vector entropy coder 410 to be outputted.

At the same time, the quantized results by the quantizer 320 are also inputted into the inverse quantizer 330, inversely quantized at the inverse quantizer 330, and then inversely and orthogonally transformed at the inverse orthogonal transformer 340, thereby reproducing the prediction error signal. An original picture signal is reproduced by adding (combining) the reproduced prediction error signal and a picture signal generated by the prediction picture generator 380 (or the intra-prediction picture generator 382) at the decoded picture generator (adder) 350, and inputted into the intra-prediction direction calculator 381, the intra-prediction picture generator 382, the de-blocking filter 384, and the decoded picture memory 360, respectively, as reference picture signals for prediction coding.

In the intra-prediction direction calculator 381, based on the original picture signal; an input signal to the prediction error signal generator 390, and the reproduced original picture signal (hereinafter, also referred to as a decoded picture signal) reproduced (decoded) at the decoded picture generator 350, the intra-prediction (intra-MB prediction) direction is calculated (determined), and intra-prediction in the direction depending on the result is performed on the reproduced original picture signal at the intra-prediction picture generator 382 to generate an intra prediction picture signal.

Moreover, in the de-blocking filter 384, in order to reduce block noise (distortion) that has been a problem for a known algorithm for coding moving pictures, the decoded picture signal is subjected to a filtering processing by means of a low pass filter at block boundaries. In this manner, in H.264, since the de-blocking filter 384 is incorporated in a coding loop, a picture signal from which block noise is removed can be used as a reference picture signal for below-mentioned motion compensation prediction, and the effect of the block noise can be removed from the prediction error by mean of the motion compensation prediction to improve the efficiency of coding.

Further, at the prediction picture generator 380, based on a decoded picture signal (reference picture signal) stored in the decoded picture memory 360, and a motion vector calculated at the motion vector calculator 370, motion compensation prediction (inter-MB prediction) is performed to generate an (inter-MB) prediction picture signal.

In addition, depending on the result of the cost comparison at the cost comparator 383, by switching the intra-MB/inter-MB switch (hereinafter, simply referred to as the "switch") 385, that is to say, by switching between an intra-prediction mode and an inter-prediction mode, any one of the inter-MB prediction picture signal and the above-mentioned intra-prediction picture signal is selectively outputted as a prediction picture signal used for detecting difference at the prediction error signal generator 390.

Here, the cost comparator 383 compares respective calculated results by the intra-prediction direction calculator 381 and the motion vector calculator 370 (for example, the absolute value of the difference between the original picture and the prediction picture in intra-prediction, and the absolute value of the difference between the original picture and the prediction picture in inter-prediction). Then, the cost comparator 383 switches the switch 385 (intra-prediction mode/inter-prediction mode) such that, when, if inter-MB prediction is used, the efficiency of coding is rather reduced due to loss of continuity as moving pictures in a mode of the smaller absolute value of the difference, that is, a scene change etc., the intra-prediction picture signal is selected as the reference picture signal for the prediction error signal generator 390, and on the contrary, when the motion compensation prediction is rather advantageous due to maintaining a continuity as moving pictures, the inter-MB prediction picture signal is selected as the reference picture signal for the prediction error signal generator 390.

Moreover, at the motion vector calculator 370, the motion vector is calculated by means of detection of the difference between the present (current picture) original picture signal and the past (former picture) decoded picture signal. (There are a progressive moving picture and an interlaced moving picture in moving pictures, and, in the interlaced moving picture, one frame is configured by two fields. At that time, the processing unit of coding can be selected from either a frame or a field. When the processing is performed by a frame (frame structure), one frame is called one picture, and when the processing is performed by a field (field structure), one field is called one picture. The coding is performed using a picture as a unit.)

In addition, as for another conventional apparatus for coding moving pictures, technologies suggested by the below-mentioned Patent Documents 1 and 2 are also present.

The technology disclosed in Patent Document 1 is one related to a video encoding/decoding for a color video, where an optimum encoding/decoding by color information is achieved by performing a first motion prediction on an input video, and then performing a second motion prediction, based on predetermined color components, on a prediction error video that is the predicted result of the first motion prediction.

The technology disclosed in Patent Document 2, is one related to encoding/decoding of a video containing a gray alpha channel, where respective blocks are classified into either a foreground region or a background region depending on the value of the gray alpha component contained in the block of picture data, the gray alpha component, brightness and the color degree component of the block contained in the foreground region are sequentially encoded, and the gray alpha component of the block contained in the background region is encoded.

Patent Document 1: Japanese Patent Application Laid-open No. 2005-39842

Patent Document 2: Japanese Patent Application Laid-open No. 2005-253088

In the H.264 standard, the filtering strength (coefficient) of the de-blocking filter 384 of a certain macro block (MB) is determined by the average of the quantized value (QP) of the DCT coefficient of the MB and the QP of the adjacent MB. However, the syntax of H.264 does not allow, when the prediction mode of the MB is not an intra-prediction mode (Intra_16×16) by means of the block size of 16×16 pixels, and the flag (CBP: Coded Block Pattern) indicating the presence of a non-zero DCT coefficient is 0, the QP of the MB to be coded. At that time, instead of the QP of the MB, the QP of the former MB is to be used for determining the filtering strength of the de-blocking filter 384.

Figure 8:
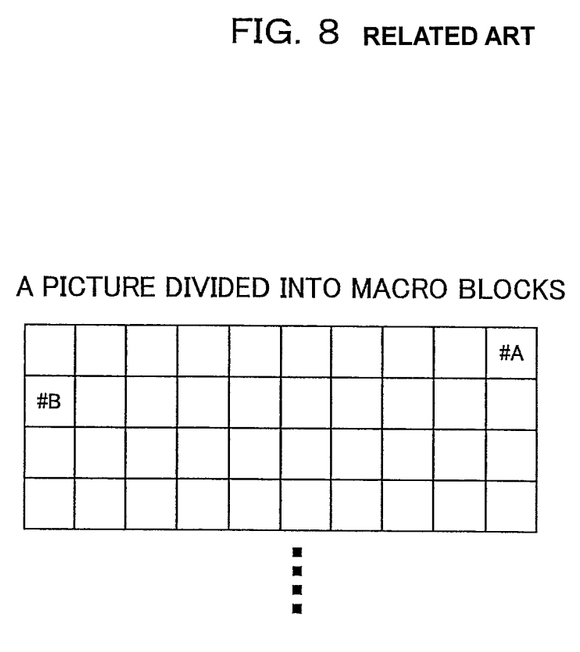
FIG. 8 is a diagram for explaining a problem of the H.264 encoder shown in FIG. 7.

Therefore, the QP used for quantizing the DCT coefficient of the MB may differ from the QP of the former (past) MB, whereby there is the case where filtering using the strength determined based on the QP of the former MB is not suitable. For example, as schematically shown in FIG. 8, when all of the DCT coefficients of the MB at a position shown by #B are zero, the filtering strength of the de-blocking filter 384 is to be determined using the QP of the former MB at a position shown by #A, which is far in a picture plane from, and may have a low statistical correlation with, the MB at the position of #B.

Moreover, when the input video is divided and encoded in parallel using a plurality of systems of encoder, the order of the MBs in a stream and the order of the MBs when coded may be exchanged in some cases. For example, as shown schematically in FIG. 9, when it is supposed to process the MBs (#1 to #40) in parallel using the four encoders designated by reference numerals A to D, each processing is to be started almost simultaneously from the MBs at #1, #11, #21, and #31.

Figure 9:
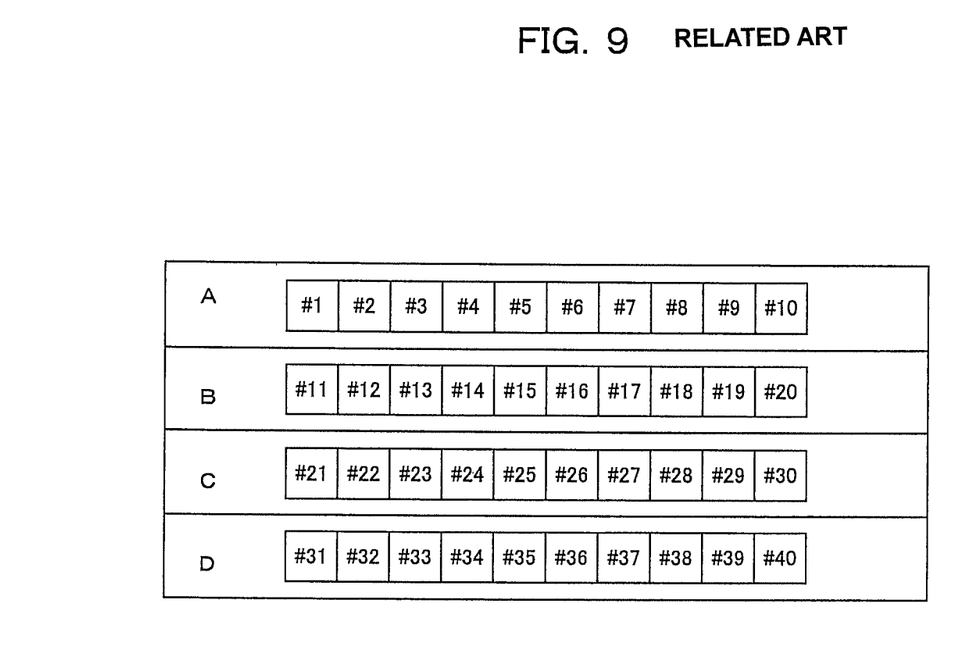
FIG. 9 is a diagram for explaining a problem of the H.264 encoder shown in FIG. 7.

At that time, when the MB at #11 is processed, the processing of the MB at #10 is not finished yet. That is, the order of MBs in the stream is from #10 to #11, however, the temporal order of processing in the encoder is reversed, i.e., from #11 to #10. Here, when all of the DCT coefficients of #11 at the encoder B are zero, the strength of the de-blocking filter 384 should be determined using the QP of #10, however, since at the time when the MBs of #11 are processed at the coder B, the QP for the MBs of #10 is not determined yet at the encoder A, it is not possible to determine the filtering strength of the de-blocking filter 384 with respect to #11.

SUMMARY OF THE INVENTION

The present invention is devised in view of the above-mentioned problems, and intended to enable coding of the quantization parameter of current element block so as to control the filtering strength even when all of the quantized results of the transformation coefficients of an element block are zero.

In order to achieve the above-mentioned object, the present invention is characterized by using the below-mentioned apparatus and method for coding moving pictures. That is, (1) The apparatus for coding moving pictures is characterized by including: an orthogonal transforming means for dividing one picture of an input video signal into element blocks composed of a plurality of pixels to perform orthogonal transformation by the each element block; a quantizing means for quantizing each transformation coefficient after orthogonally transformed by the orthogonal transforming means using a quantization parameter; a coding means for coding the quantization parameter, when the transformation coefficient is not zero; a decoded picture generating means for inversely quantizing and then inversely and orthogonally transforming the quantized results of the quantizing means to generate a reference picture signal for a motion compensation prediction; a filtering means for filtering the reference picture signal obtained by the decoded picture generating means at a filtering strength corresponding to the quantization parameter, when a non-zero effective transformation parameter is present with respect to the element blocks; and a controlling means for controlling at least any one of transformation coefficients to be not zero, when all of the transformation coefficients obtained by the orthogonal transforming means are zero.

(2) Here, the controlling means may be configured so as to control a quantization parameter to be coded by the coding means to a value or less of the quantization parameter used by the quantizing means.

(3) Moreover, the controlling means may set the range of the quantization parameter to be coded by the coding means to a range where all of the inversely and orthogonally transformed results of the transformation coefficients controlled to be not zero, are zero.

(4) Further, the controlling means may control the direct current component of color difference to be not zero, to control the transformation coefficients to be not zero.

(5) Moreover, the apparatus for coding moving pictures of the present invention is characterized by including: an orthogonal transforming means for dividing one picture of an input video signal into element blocks composed of a plurality of pixels to perform orthogonal transformation by the each element block; a quantizing means for quantizing each transformation coefficient after orthogonally transformed by the orthogonal transforming means using a quantization parameter; a coding means for coding a coded block pattern (CBP) code representing which one of small blocks further divided from the element blocks has the non-zero transformation coefficients; a decoded picture generating means for inversely quantizing and then inversely and orthogonally transforming the quantized results of the quantizing means to generate a reference picture signal for a motion compensation prediction; a filtering means for filtering the reference picture signal obtained by the decoded picture generating means at a filtering strength corresponding to the quantization parameter, when non-zero effective transformation parameters are present with respect to the element blocks; and a controlling means for controlling the CBP code to a code indicating the presence of the non-zero transformation coefficients, when the CBP code indicates the non-presence of the non-zero transformation coefficients.

(6) Further, the method for coding moving pictures according to the present invention is characterized by including: an orthogonal transforming step for dividing one picture of an input video signal into element blocks composed of a plurality of pixels to perform orthogonal transformation by the each element block; a quantizing step for quantizing each transformation coefficient after orthogonally transformed, using a quantization parameter; a coding step for coding the quantization parameter, when the transformation parameter is not zero; a decoded picture generating step for inversely quantizing and then inversely and orthogonally transforming the quantized results to generate a reference picture signal for a motion compensation prediction; a filtering step for filtering the reference picture signal obtained by the decoded picture generating step at a filtering strength corresponding to the quantization parameter, when non-zero effective transformation parameters are present with respect to the element blocks; and a controlling step for controlling at least any one of transformation coefficients to be not zero, when all of the transformation coefficients obtained by the orthogonal transforming step are zero.

(7) Here, the controlling step may include a step for controlling a quantization parameter to be coded in the coding step to a value or less of the quantization parameter used in the quantizing step.

(8) Moreover, in the controlling step, the range of the quantization parameter to be coded in the coding step may be set to a range where all of the inversely and orthogonally transformed results of the transformation coefficients controlled to be not zero, are zero.

(9) Further, the controlling step may include a step for controlling the direct current component of color difference to be not zero, to control the transformation coefficients to be not zero.

(10) Moreover, the method for coding moving pictures according to the present invention is characterized by including: an orthogonal transforming step for dividing one picture of an input video signal into element blocks composed of a plurality of pixels to perform orthogonal transformation by the each element block; a quantizing step for quantizing each transformation coefficient after orthogonally transformed by the orthogonal transforming step using a quantization parameter; a coding step for coding a coded block pattern (CBP) representing which one of small blocks further divided from the element blocks has a non-zero transformation coefficient; a decoded picture generating step for inversely quantizing and then inversely and orthogonally transforming the quantized results of the quantizing step to generate a reference picture signal for a motion compensation prediction; a filtering step for filtering the reference picture signal obtained by the decoded picture generating step at a filtering strength corresponding to the quantization parameter, when non-zero effective transformation parameters are present with respect to the element blocks; and a controlling step for controlling the CBP code to a code indicating the presence of the non-zero transformation coefficients, when the CBP code indicates the non-presence of the non-zero transformation coefficients.

According to the present invention mentioned above, at least the following effects or advantages can be attained.

(1) Even when all of the quantized results of the transformation coefficients of the element block are zero, by controlling any one of the transformation coefficients to be non-zero, the quantization parameter of the current element block can be coded and the filtering strength of the filtering means of the current element block can be controlled, whereby it is possible to prevent the filtering strength of the filtering means of the current element block from being determined only by means of the quantization parameter of another element block (former element block). Thus, since the filtering strength of the filtering means can be always controlled suitably, the performance for removing block noise improves more than ever before, and thereby enabling to improve the efficiency of coding.

(2) Since the QP of the current MB can be encoded, when encoding is performed in parallel using a plurality of encoders, it is possible to avoid the mismatch of the filtering strength of the filtering means between the encoder and the decoder, with little impairing of amount of information or picture quality.

(3) By controlling the quantization parameter to a value or less of the quantization parameter used in the quantizing means, noises occurring due to controlling the originally zero transformation coefficient to be non-zero, can be suppressed.

DESCRIPTION OF THE PREFERRED EMBODIMENTS

Hereinafter, using drawings, embodiments of the present invention will be described.

(A) Description of the First Embodiment

Figure 1:
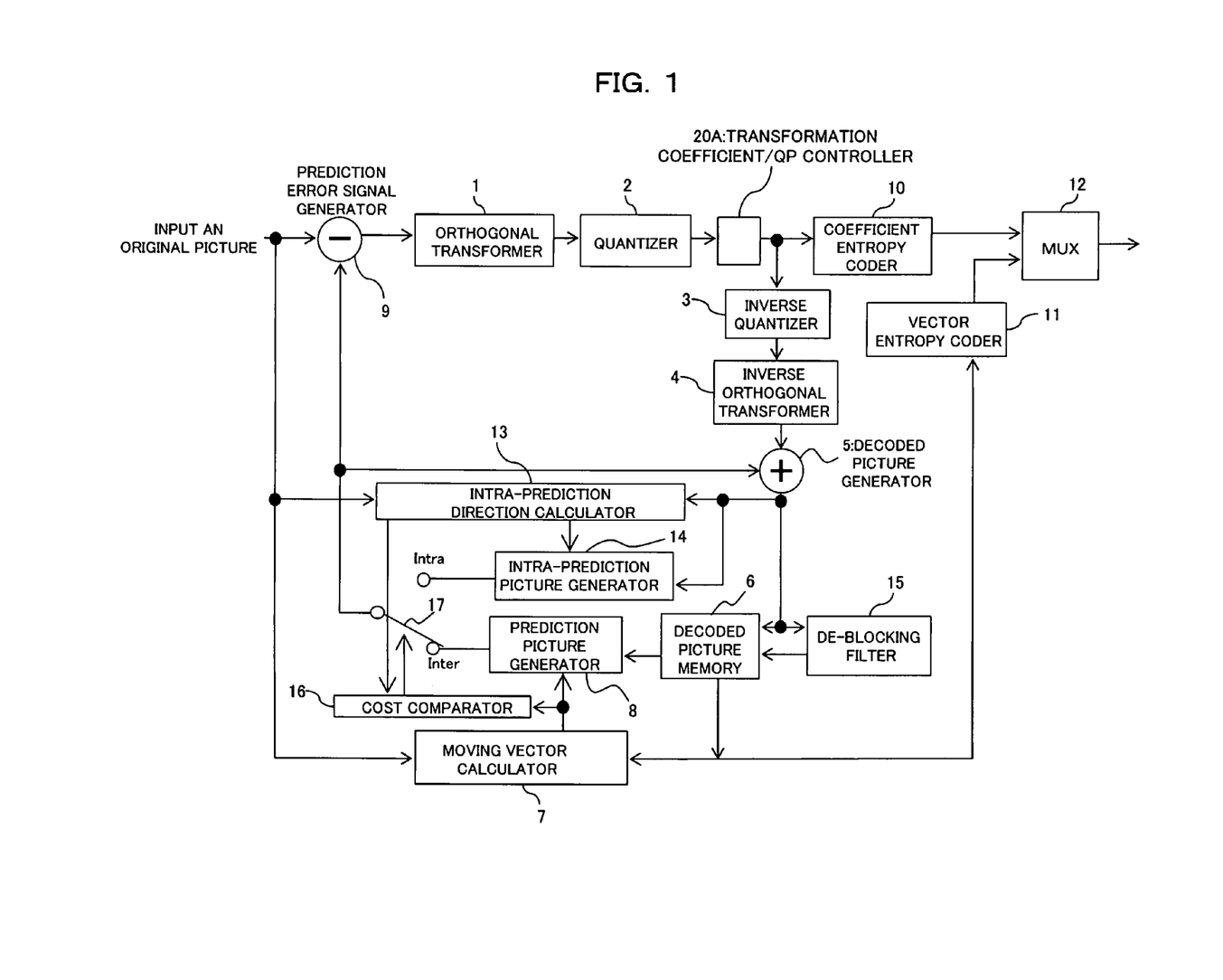
FIG. 1 is a block diagram showing a main configuration of an H.264 encoder as an apparatus for coding moving pictures according to a first embodiment of the present invention.

FIG. 1 is a block diagram showing the main configuration of an H.264 encoder as an apparatus for coding moving pictures according to the first embodiment of the present invention. Similar to the above-mentioned encoder in FIG. 7, the encoder shown in FIG. 1 also comprises: an orthogonal transformer 1, a quantizer 2, an inverse quantizer 3, an inverse orthogonal transformer 4, a decoded picture generator (adder) 5, a decoded picture memory (frame memory) 6, a motion vector calculator 7, a prediction picture generator 8, a prediction error signal generator 9, a coefficient entropy coder 10, a vector entropy coder 11, a multiplexer 12, an intra-prediction direction calculator 13, an intra-prediction picture generator 14, a de-blocking filter (loop filter) 15, a cost comparator 16, and an intra/inter (intra-MB/inter-MB) switch 17, and further comprises a transformation coefficient/QP controller 20A between the quantizer 2 and the coefficient entropy coder 10.

Here, the prediction error signal generator 9 has a function to generate a prediction error signal by detecting the difference between the input video signal (original picture input) and the prediction picture signal in an intra (intra-MB) prediction mode or the prediction picture signal in an inter (inter-MB) prediction mode; the orthogonal transformer 1 has a function to perform orthogonal transformation processing such as DCT transformation on the each MB by dividing one picture of the prediction error signal (input video signal) into MBs (for example, MB having a block size of maximum 16×16 pixels), and the quantizer 2 has a function to quantize the transformation coefficients obtained by the orthogonal transformation processing (for example, DCT coefficients) using a quantization parameter (QP).

The inverse quantizer 3 has a function to reproduce the transformation coefficient before subjected to the above-mentioned quantization by inversely quantizing the quantized MB, the inverse orthogonal transformer 4 has a function to reproduce the prediction error signal before orthogonally transformed by the orthogonal transformer 1 by inversely and orthogonally transforming the transformation coefficients reproduced by the inverse quantizer 3.

The decoded picture generator 5 has a function to reproduce (decode) the original picture signal to be used as the reference picture signal for a motion compensation prediction, by adding (combining) the reproduced prediction error signal and the prediction picture signal in the intra-prediction mode or the prediction picture signal in the inter-prediction mode.

That is to say, the inverse quantizer 3, the inverse orthogonal transformer 4, and the decoded picture generator 5 are to function as a decoded picture generating means for inversely quantizing and inversely and orthogonally transforming the quantized results of the quantizer 2 to generate the reference picture signal for the motion compensation prediction.

The intra-prediction direction calculator 13, based on the original picture signal that is an input signal into the prediction error signal generator 9 and the decoded original picture signal reproduced (decoded) at the decoded picture generator 5, calculates the prediction direction in the intra-prediction (intra-MB prediction) mode. The result is designed to be supplied to the intra-prediction picture generator 14 and the cost comparator 16, respectively.

The intra-prediction picture generator 14 has a function to generate an intra-prediction picture signal by performing an intra-prediction in a direction corresponding to the calculated result by the intra-prediction direction calculator 13, and the de-blocking filter (filtering means) 15, in order to reduce block noise (distortion), has a function to perform filtering processing on the block boundaries by means of a low pass filter, and to filter the current MB at the filtering strength determined when non-zero effective transformation coefficients are present by determining the filtering strength corresponding to the QP of the last MB including the MB to be coded and having effective (non-zero) transformation coefficient.

The decoded picture memory 6 has a function to store a decoded picture signal after filtered by the de-blocking filter 15 (or not filtered), and the prediction picture generator 8 has a function to generate an (inter-MB) prediction picture signal by performing a motion compensation prediction (inter-MB prediction), based on the decoded picture signal (reference picture signal) stored in the decoded picture memory 6 and the motion vector calculated by the motion vector calculator 7.

The motion vector calculator 7 has a function to calculate a motion vector by detecting the difference between the present (current picture) original picture signal and the past (former picture) decoded picture signal. The cost comparator 16 has a function to adaptively switch an intra-prediction mode and an inter-prediction mode, based on the motion vector obtained by the motion vector calculator 7 and the calculated result at the intra-prediction direction calculator 13. In this embodiment, the cost comparator 16 also compares respective calculated results by the intra-prediction direction calculator 13 and the motion vector calculator 7 (for example, the absolute value of the difference between the original picture and the prediction picture in intra-prediction, and the absolute value of the difference between the original picture and the prediction picture in inter-prediction). Then, the cost comparator 16 controls the intra-MB/inter-MB switch (hereinafter, also simply called as "switch") 17 such that, when, if inter-MB prediction is used, the efficiency of coding is rather reduced due to loss of continuity as moving pictures in a mode of the smaller absolute value of the difference, that is, a scene change etc., the intra-MB prediction picture signal is selected as the reference picture signal for the prediction error signal generator 9, and on the contrary, when the motion compensation prediction is rather advantageous due to maintaining a continuity as moving pictures, the inter-MB prediction picture signal is selected as the reference picture signal for the prediction error signal generator 9.

The coefficient entropy coder (coding means) 10 has a function to subject the output of transformation coefficient/QP controller 20A (QP and CBP code) to entropy coding such as Huffman coding or arithmetic coding, and here is designed to code the QP when the transformation coefficient is not zero. The vector entropy coder 11 has a function to subject the moiton vector obtained by the motion vector calculator 7 to entropy coding such as Huffman coding or arithmetic coding, and the multiplexer 12 has a function to multiplex and output the coded results obtained by the coders 10 and 11.

Figure 2:
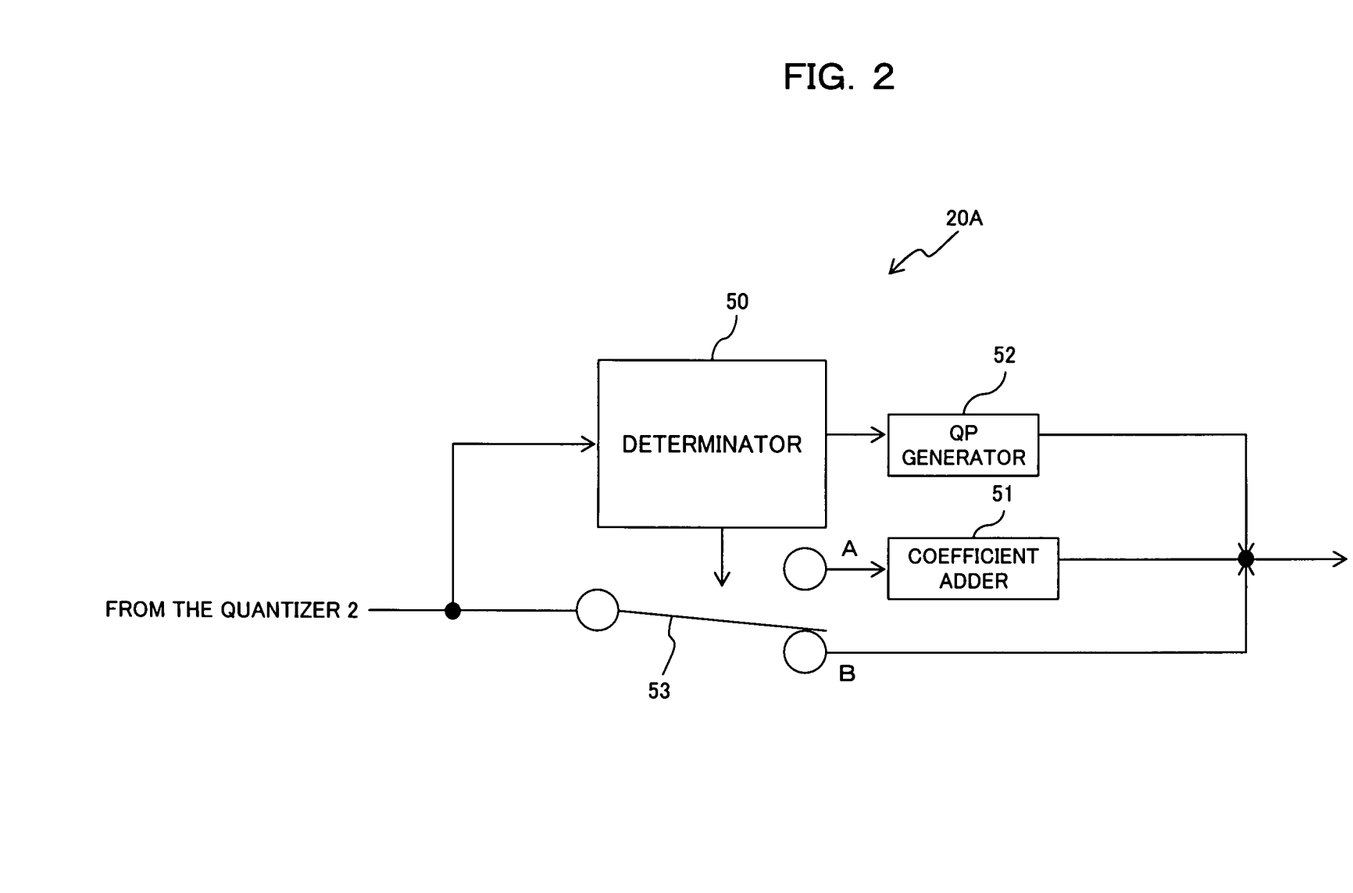
FIG. 2 is a block diagram showing an example of the configuration of the transformation coefficient/QP controller shown in FIG. 1.

In addition, the transformation coefficient/QP controller (controlling means) 20A, even when all of the quantized results by the quantizer 2, (i.e. the quantized results of the transformation coefficients of MBs, are zero), has a function to control (change) any one of the transformation coefficients to be not zero, and to control the QP value used as an determinant factor of the filtering strength of the de-blocking filter 15. To this end, the transformation coefficient/QP controller (controlling means) 20A, for example, as shown in FIG. 2, includes a determinator 50, a coefficient adder 51, a QP generator 52, and a switch 53.

Here, the determinator 50 has a function to determine whether the prediction mode of MB is not the intra-prediction mode (Intra_16×16) composed of a block size of 16×16 pixels and whether or not all of the coefficients of DCT are zero (the CBP code is zero). The determinator 50 is arranged to switch the switch 53 to the side of the coefficient adder 51 (A side) when the determining conditions are satisfied, and is designed to switch the switch 53 to the reverse side (B side) when the determining conditions are not satisfied. In this manner, when the determining conditions are satisfied, the output of the coefficient adder 51 is to be inputted into the subsequent coefficient entropy coder 10 and the inverse quantizer 3, and when the determining conditions are not satisfied, the output of the quantizer 2 is to be directly inputted into the subsequent coefficient entropy coder 10 and the inverse quantizer 3.

The coefficient adder 51 has a function to change any one of the DCT coefficients to a non-zero value, and, for example, is arranged to be able to change the coefficients of DCT to be not zero by setting the DC component of color difference Cb to 1 as described below.

The QP generator 52, since, when the determining conditions are satisfied at the determinator 50, accompanied with changing of any one of the DCT coefficients, originally all of them being zero, to a non-zero value by the coefficient adder 51, the changed coefficient becomes a noise, in order to suppress the occurrence of the noise, has a function to change the QP value by generating a QP value being equal to or less than the original QP value (the QP value before the DCT coefficient is changed to be not zero).

Hereinafter, the operation of the H.264 encoder of the present embodiment configured as mentioned above will be described. However, in the following, it is supposed that coefficient transformation is performed by means of DCT at the orthogonal transformer 1, and inverse DCT transformation is performed at the inverse orthogonal transformer 4.

First, an original picture signal is inputted into the prediction error signal generator 9, the intra-prediction direction calculator 13, and the motion vector calculator 7, respectively. In the prediction error signal generator 9, a prediction error signal is generated by detecting the difference between the original picture signal and the output of the switch 17, i.e. the prediction picture signal generated by the intra-prediction picture generator 14 or the prediction picture generator 8, the prediction error signal is subjected to DCT for each MB having a block size of maximum 16×16 pixels at the orthogonal transformer 1 (orthogonal transforming step), and then the DCT coefficients are quantized using a quantization parameter (QP) at the quantizer 2 (quantizing step).

Then, the quantized results are inputted into the determinator 50 of the transformation coefficient/QP controller 20A, and it is determined whether the prediction mode of MB is not the intra-prediction mode (Intra_16×16) by means of a block size of 16×16 pixels, and whether or not all of the coefficients of DCT are zero (the CBP code is zero) or not, at the transformation coefficient/QP controller 20A. As a result, when the determination conditions are not satisfied, the switch 53 is switched to the B side (see, FIG. 2) by the determinator 50, and the quantized results by the quantizer 2 are directly outputted into the coefficient entropy coder 10 and the inverse quantizer 3.

At the coefficient entropy coder 10, the quantized results are subjected to entropy coding such as Huffman coding or arithmetic coding (coding step), and the coded results are multiplexed with the results of entropy coding at the vector entropy coder 11 of motion vectors calculated by the motion vector calculator 7 to be outputted.

At the same time, at the inverse quantizer 3, the prediction error signal before subjected to DCT by the orthogonal transformer 1 is reproduced, by inversely quantizing the quantized results to reproduce a signal before quantized by the quantizer 2, and subjecting the signal to inverse DCT at the inverse orthogonal transformer 4 (decoded picture generating step). Then, an original picture signal is reproduced by adding the reproduction prediction error signal and the output of the switch 17, i.e., the picture signal generated by the prediction picture generator 8 or the intra-prediction picture generator 14, at the decoded picture generator (adder) 5. Then, the original picture signal is inputted into the intra-prediction direction calculator 13, the intra-prediction picture generator 14, the de-blocking filter 15, and the decoded picture memory 6, respectively, as a picture signal for prediction coding.

At the intra-prediction direction calculator 13, based on the original picture signal i.e., the input signal inputted into the prediction error signal generator 9, and the decoded picture signal reproduced (decoded) at the decoded picture generator 5, an intra-prediction (intra-MB prediction) direction is calculated (determined), and an intra-prediction in the direction corresponding to the result is performed with respect to the reproduced original image signal to generate an intra-prediction picture signal at the intra-prediction picture generator 14.

Moreover, at the de-blocking filter 15, in order to reduce block noise (distortion) that has been a problem in a conventional algorithm for coding moving pictures, when non-zero effective coefficients are present in the transformation coefficients with respect to the current MB, the decoded picture signal is subjected to a filtering processing by means of a low pass filter at the block boundaries at a filtering strength corresponding to the QP of last MB where effective coefficients were present (filtering step). In this manner, as described above, the picture signal whose block noise is removed can be used as a reference signal of the below-mentioned motion compensation prediction, and it is possible to remove the effect of block noise from the prediction error by means of the motion compensation prediction to improve the efficiency of coding.

Further, at the prediction picture generator 8, based on the decoded picture signal (reference picture signal) stored in the decoded picture memory 6 and motion vectors calculated in the motion vector calculator 7, a motion compensation prediction (inter-MB prediction) is performed to generate an (inter-MB) prediction picture signal.

In addition, either one of the inter-MB prediction picture signal and the intra-prediction picture signal is selectively outputted as a prediction picture signal used for detecting differences at the prediction error signal generator 9, by switching the switch 17 correspondingly to the result of cost comparison at the cost comparator 16, i.e., switching between the intra-prediction mode and the inter-prediction mode.

The above is the operation of the determinator 50, when the above-mentioned determining conditions [the prediction mode of MB is not the intra-prediction mode (Intra_16×16) by means of a block size having 16×16 pixels, and all of the DCT coefficients are zero (CBP is zero)] are not satisfied, but when the determining conditions are satisfied, the determinator 50 is to switch the switch 53 shown in FIG. 2 to A side.

Figure 3:
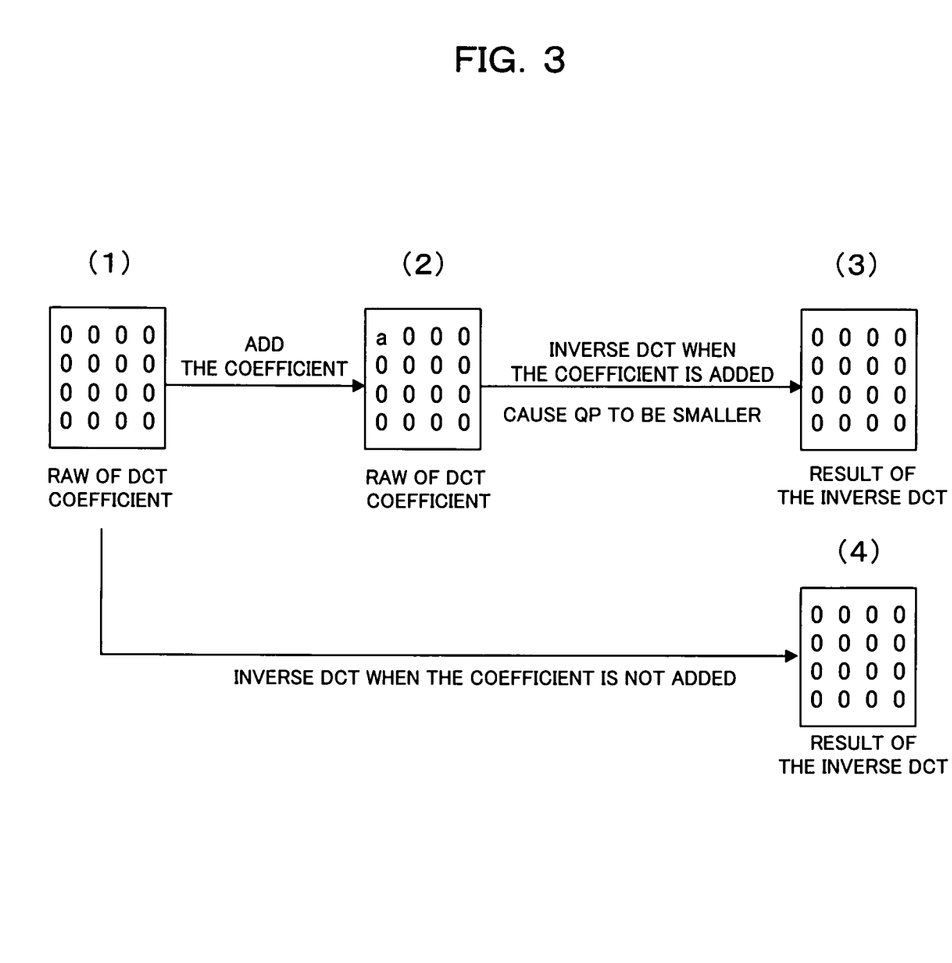
FIG. 3 is a schematic view for explaining the operation of the transformation coefficient/QP controllers shown in FIGS. 1 and 2.

Accordingly, the quantized result by the quantizer 2 is inputted into the coefficient adder 51, and the coefficient adder 51, in order to cause at least any one of rows of DCT coefficients all of them being zero to be not zero, adds a predetermined coefficient a (a≠0) (refer to (1) and (2) in FIG. 3: controlling step). More specifically, for example, the DC component of color difference Cb is set to 1.

On the other hand, at the QP generator 52, since CBP becomes non-zero (for example, 16) from zero by setting the DC component of color difference Cb to 1 as mentioned-above, in order to suppress the noise due to the change of the DCT coefficients (ideally, cause the noise to be zero), the value of a quantization parameter of color difference (qpc) is obtained from the value of the DC component of the quantization matrix of color difference (ChromaScalingListDC) shown in the following Table 1 by means of table lookup. In addition, the following Table 1 indicates the range of quantization parameter value (qpc) where the result of the inverse DCT becomes zero even when the coefficient is set to 1 (not zero).

Then, from the obtained quantization parameter value (qpc), a quantization parameter value (qp1) of brightness corresponding to the quantization parameter value (qpc) is further obtained from the following Table 2 by means of table lookup, and by comparing the value of the quantization parameter of the brightness (qp1) and the value of the quantization parameter with respect to the former MB (qpA), the smaller one (either value can be naturally selected in the case of having the same value) is set as the QP value to be coded. As shown in (3) and (4) in FIG. 3, this gives the same result of the inverse DCT (all of the rows of the DCT coefficients are zero) by the inverse orthogonal transformer 4, between the cases when the coefficient addition is performed and when the coefficient addition is not performed.

The subsequent operations are similar to the case when the determining conditions are not satisfied, however, at the de-blocking filter 15, the strength is to be determined using the QP value obtained finally in the above-mentioned manner.

TABLE 1

Maximum QP value where the result of inverse DCT becomes zero even when coefficient is set to 1

| ChromaScalingListDC | qpc |
|---|---|
| ... | ... |
| 4 | 27 |
| 5 | 25 |
| 6 | 24 |
| 7 | 22 |
| 8 | 21 |
| 9 | 20 |
| 10 | 19 |
| 11 | 19 |
| 12 | 18 |
| 13 | 17 |
| 14 | 16 |
| 15 | 16 |
| 16 | 15 |
| ... | ... |

TABLE 2

The mapping table of qpc and qp1 when chroma_qp_index_offset = 0

| qpc | qp1 |
|---|---|
| <29 | =qpc |
| 29 | 30 |
| 30 | 31 |
| 31 | 32 |
| 32 | 34 |
| 33 | 35 |
| 34 | 37 |
| 35 | 39 |
| 36 | 41 |
| 37 | 44 |
| 38 | 47 |
| 39 | 51 |

As mentioned above, according to this embodiment, even when all of the quantized results of the transformation coefficients of MB (DCT coefficients) are zero, since the QP of the current MB can be coded, and the filtering strength of the de-blocking filter 15 of the current MB can be controlled, by changing any one of transformation coefficients to be not zero, when the CBP of the current MB is zero, it is possible to prevent the filtering strength of the de-blocking filter 15 of the MB from being determined only by the QP value of another MB (former MB).

Accordingly, the filtering strength of the de-blocking filter 15 can be always controlled suitably, and the performance for removing block noise improves more than ever before, thereby enabling to improve the efficiency of coding.

Moreover, even when the above-mentioned parallel processing in FIG. 9 is performed, since the QP of the current MB can be always coded, when the parallel coding is performed using a plurality of coders, the mismatch of the filtering strength of the de-blocking filter 15 between the encoder and the decoder can be avoided with little impairing of amount of information or picture quality.

(B) Description of a Second Embodiment

Figure 4:
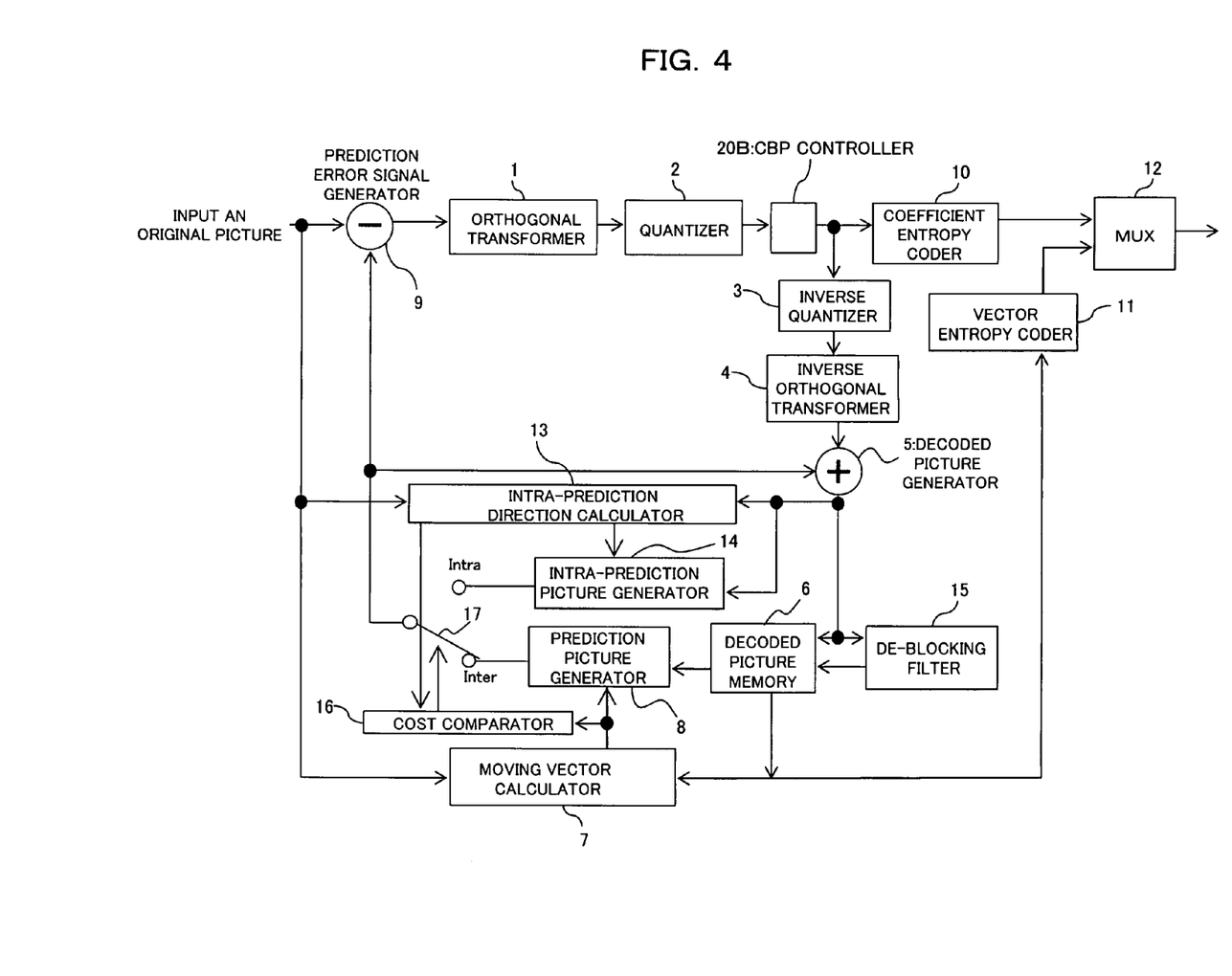
FIG. 4 is a block diagram showing a main configuration of an H.264 encoder as an apparatus for coding moving pictures according to a second embodiment of the present invention.

FIG. 4 is a block diagram showing the main configuration of an H.264 encoder as an apparatus for coding moving pictures according to the second embodiment of the present invention, and the encoder shown in FIG. 4 differs as compared to the above-mentioned encoder according to the first embodiment in that CBP controller 20B is included instead of the transformation coefficient/QP controller 20A. In addition, unless otherwise stated, other components labeled by already described reference numerals are same or similar to the already described ones.

Figure 5:
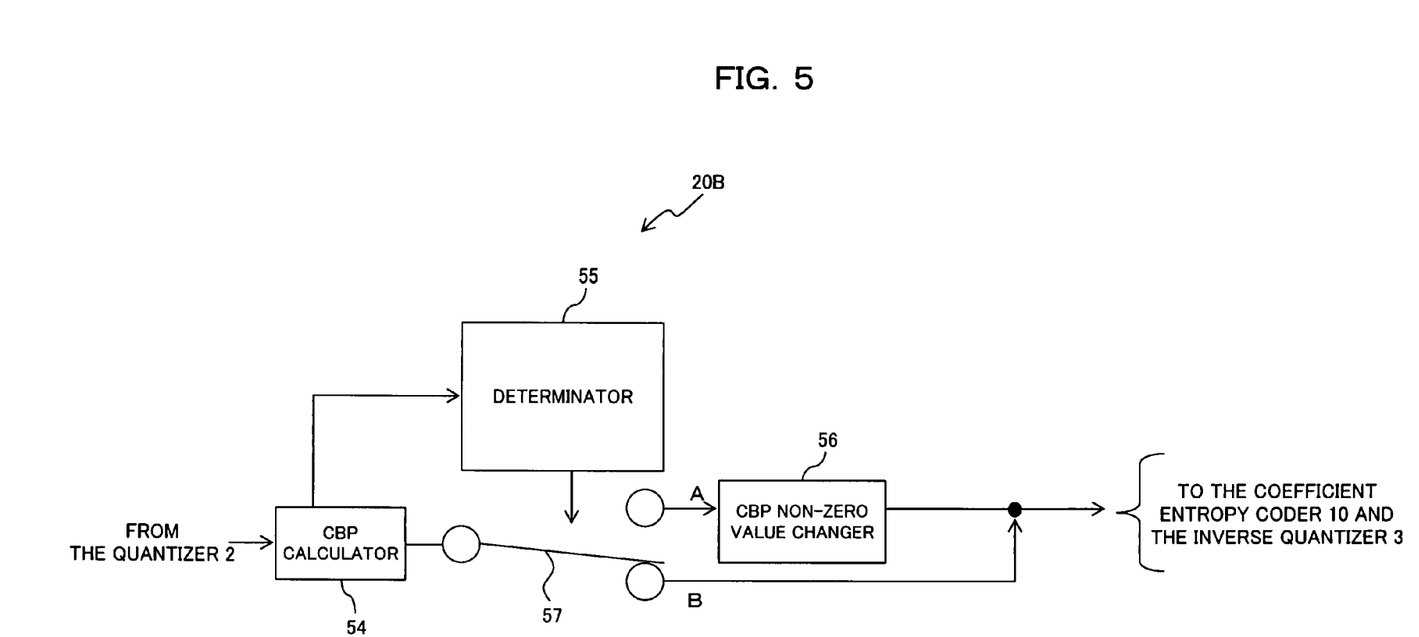
FIG. 5 is a block diagram showing an example of the configuration of the CBP controller shown in FIG. 4.

Here, the CBP controller 20B has a function to control (change) CBP so as to indicate the presence of non-zero transformation coefficients, when the CBP code representing which one of small blocks further divided from the MB has a non-zero transformation coefficient, is zero (when the non-presence of non-zero transformation coefficients is indicated), and for this reason, in this embodiment, for example, as shown in FIG. 5, includes a CBP calculator 54, a determinator 55, a CBP non-zero value changer 56, and a switch 57.

Here, the CBP calculator 54 has a function to calculate a CBP code from the quantized results by the quantizer 2, and the determinator 55 has a function to determine whether the prediction mode of MB is not the intra-prediction mode (Intra_16×16) by means of a block size of 16×16 pixels, and whether or not the CBP code of a certain MB calculated by the CBP calculator 54 is zero. The determinator 55 is designed to switch the switch 57 to the side of the CBP non-zero value changer 56 (A side) when the determining conditions are satisfied, and to switch the switch 57 to the reverse side (B side) when the determining conditions are not satisfied. In this manner, when the determining conditions are satisfied, the output of the CBP non-zero value changer 56 is to be outputted to the coefficient entropy coder 10 and the inverse quantizer 3 respectively, and when the determining conditions are not satisfied, the CBP code calculated by the CBP calculator 54 is to be directly outputted to the coefficient entropy coder 10 and the inverse quantizer 3 respectively.

In addition, the CBP non-zero value changer 56 has a function to change the CBP code calculated by the CBP calculator 54 to be not zero (however, all of the DCT coefficients remain to be zero).

In the encoder according to this embodiment, configured as mentioned above, based on the quantized results by the quantizer 2, a CBP code of the current MB is calculated by the CBP calculator 54 of the CBP controller 20B, and it is determined by the determinator 55 whether or not the result is zero when the result is not the intra-prediction mode (Intra_16×16) by means of a block size of 16×16 pixels.

Figure 6:
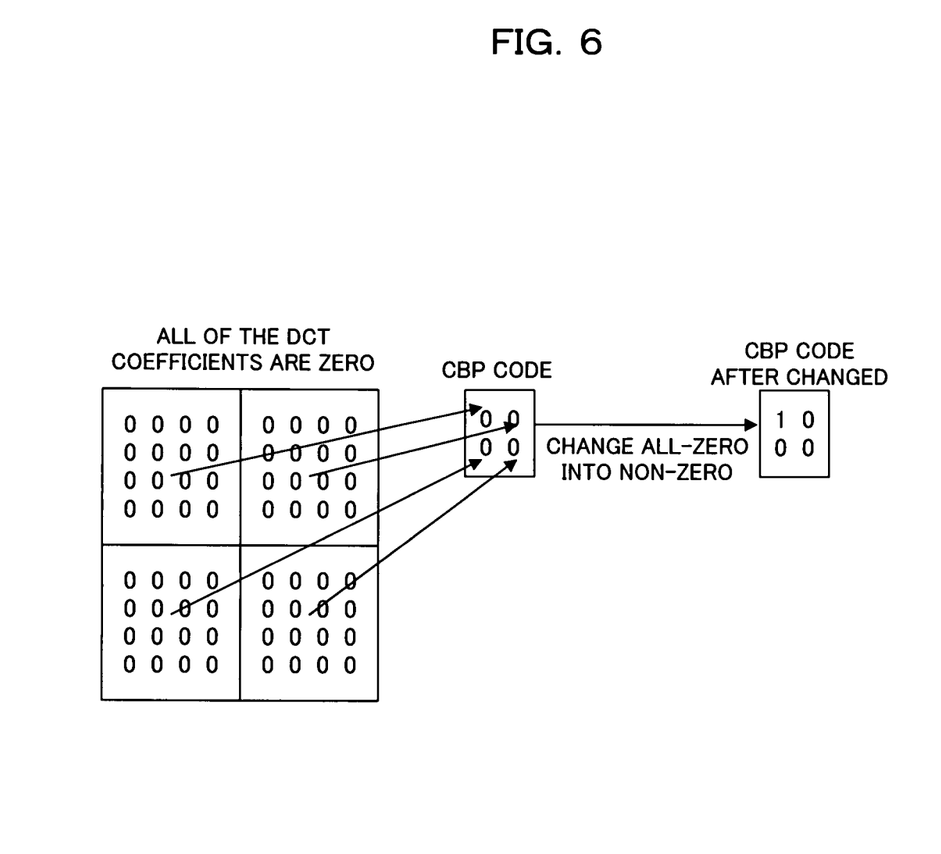
FIG. 6 is a schematic view for explaining the operation of the CBP controller shown in FIGS. 4 and 5.

As a result, when the determining conditions are satisfied, the switch 57 is switched to A side by the determinator 55, and, for example, as shown schematically in FIG. 6, the CBP code is changed to a non-zero value (in FIG. 6, the value of the first row and the first column is changed to 1) with all of the DCT coefficients being remained to be zero by the CBP non-zero value changer 56.

In this manner, even when the CBP code indicates the non-presence of the non-zero transformation coefficients (DCT coefficients), by (coercively) changing the CBP code so as to indicate the presence of the non-zero transformation coefficients, the QP of the current MB can be coded, thereby enabling the control of the strength of the de-blocking filter 15 of the current MB.

Accordingly, similar to the first embodiment, even when the CBP of the current MB is zero, the filtering strength of the de-blocking filter 15 can be always controlled suitably while preventing the filtering strength of the de-blocking filter 15 of the MB from being determined only by means of the QP value of another MB (former MB). As a result, the performance for removing block noise improves more than ever before, thereby enabling to improve the efficiency of coding.

Moreover, in this embodiment, even when the above-mentioned parallel processing in FIG. 9 is performed, since the QP of the current MB can be always coded, when the parallel coding is performed using a plurality of coders, the mismatch of the filtering strength of the de-blocking filter 15 between the encoder and the decoder can also be avoided with little impairing of amount of information or picture quality.

It is needless to mention that the present invention is not limited to the above embodiments, rather can be implemented in various modifications within a scope without departing from the gist of the present invention.

As described above in detail, according to the present invention, even when all of the quantized results of the transformation coefficients of element blocks are zero, by controlling any one of the transformation coefficients to be not zero, the quantization parameter of the current element block can be coded, and the filtering strength of the filtering means of the current element block can be controlled. Therefore, the filtering strength of the filtering means can be always controlled suitably, the performance for removing block noise improves more than ever before, and thereby enabling to improve the efficiency of coding. Accordingly, the present invention can be considered to be extremely useful in a technical field using the technology for coding moving pictures.

What is claimed is:

1. An apparatus comprising:
a transformer to divide one picture of an input video signal into element blocks composed of a plurality of pixels and to perform orthogonal transformation on each of the element blocks, to thereby obtain transformation coefficients;
a quantizer to quantize each of the transformation coefficients, using a quantization parameter, to thereby provide quantized results;
a coder to code the quantization parameter, when all of the transformation coefficients are not zero;
a decoded picture generator to inversely quantize and then inversely and orthogonally transform the quantized results to generate a reference picture signal for a motion compensation prediction;
a filter to filter the reference picture signal at a filtering strength corresponding to the quantization parameter, the quantization parameter being available when a non-zero effective transformation coefficient is present with respect to the element blocks; and
a controller to:
control at least any one of the transformation coefficients to be not zero, when all of the transformation coefficients are zero, to thereby make available the quantization parameter used by the filter when a non-zero effective transformation coefficient is present with respect to the element blocks, and
set a range of the quantization parameter coded by the coder to a range where all of inversely and orthogonally transformed quantized results for a decoding to regenerate a picture become zero, when the at least one of the transformation coefficients is controlled to be not zero, to thereby cancel a noise generated in the regenerated picture due to the controlling of the transformation coefficients to make available the quantization parameter used by the filter when the non-zero effective transformation coefficient is present with respect to the element blocks.

2. The apparatus according to claim 1, wherein the controller is configured so as to control the quantization parameter to be coded by the coder to a value or less of the quantization parameter used by the quantizer.

3. The apparatus according to claim 1, wherein the controller controls a direct current component of a color difference to be not zero, to control said at least one of the transformation coefficients to be not zero.

4. A method comprising:
dividing one picture of an input video signal into element blocks composed of a plurality of pixels and performing orthogonal transformation on each of the element blocks, to thereby obtain transformation coefficients;
quantizing each of the transformation coefficients, using a quantization parameter, to thereby provide quantized results;
coding the quantization parameter, when all of the transformation coefficients are not zero;
inversely quantizing and then inversely and orthogonally transforming the quantized results to generate a reference picture signal for a motion compensation prediction;
filtering the reference picture signal at a filtering strength corresponding to the quantization parameter, the quantization parameter being available when a non-zero effective transformation coefficient is present with respect to the element blocks;
controlling at least any one of the transformation coefficients to be not zero, when all of the transformation coefficients are zero, to thereby make available the quantization parameter used by the filter when a non-zero effective transformation coefficient is present with respect to the element blocks; and
setting a range of the quantization parameter coded by said coding to a range where all of inversely and orthogonally transformed quantized results for a decoding to regenerate a picture become zero, when said at least one of the transformation coefficients is controlled to be not zero, to thereby cancel a noise generated in the regenerated picture due to the controlling of the transformation coefficients to make available the quantization parameter used by the filter when the non-zero effective transformation coefficient is present with respect to the element blocks.

5. The method according to claim 4, further comprising:
controlling the quantization parameter to be coded by said coding to a value or less of the quantization parameter used in said quantizing.

6. The method according to claim 4, wherein said controlling includes controlling a direct current component of a color difference to be not zero, to control the at least one of the transformation coefficients to be not zero.

7. An apparatus comprising:

means for dividing one picture of an input video signal into element blocks composed of a plurality of pixels and for performing orthogonal transformation on each of the element blocks, to thereby obtain transformation coefficients;

means for quantizing each of the transformation coefficients, using a quantization parameter, to thereby provide quantized results;

means for coding the quantization parameter, when all of the transformation coefficients are not zero;

means for inversely quantizing and then inversely and orthogonally transforming the quantized results to generate a reference picture signal for a motion compensation prediction;

means for filtering the reference picture signal at a filtering strength corresponding to the quantization parameter, the quantization parameter being available when a non-zero effective transformation coefficient is present with respect to the element blocks;

means for controlling at least any one of the transformation coefficients to be not zero, when all of the transformation coefficients are zero, to thereby make available the quantization parameter used by the filter when a non-zero effective transformation coefficient is present with respect to the element blocks; and means for setting a range of the quantization parameter coded by said means for coding to a range where all of inversely and orthogonally transformed quantized results for a decoding to regenerate a picture become zero, when said at least one of the transformation coefficients is controlled to be not zero, to thereby cancel a noise generated in the regenerated picture due to the controlling of the transformation coefficients to make available the quantization parameter used by the filter when the non-zero effective transformation coefficient is present with respect to the element blocks.

* * * * *

UNITED STATES PATENT AND TRADEMARK OFFICE
CERTIFICATE OF CORRECTION

PATENT NO. : 8,761,264 B2
APPLICATION NO. : 11/497288
DATED : June 24, 2014
INVENTOR(S) : Satoshi Shimada et al.

Page 1 of 1

It is certified that error appears in the above-identified patent and that said Letters Patent is hereby corrected as shown below:

On the Title Page

Column 2, Item [57] (Abstract), Line 13, Delete "anyone" and insert -- any one --, therefor Signed and Sealed this
Thirteenth Day of January, 2015

Michelle K. Lee
*Deputy Director of the United States Patent and Trademark Office*